(12) United States Patent
Kimura

(10) Patent No.: US 7,171,006 B2
(45) Date of Patent: Jan. 30, 2007

(54) VOCAL SOUND INPUT APPARATUS FOR AUTOMOTIVE VEHICLE

(75) Inventor: Makoto Kimura, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/733,234

(22) Filed: Dec. 12, 2003

(65) Prior Publication Data

US 2004/0133426 A1   Jul. 8, 2004

(30) Foreign Application Priority Data

Jan. 7, 2003   (JP)   ............................. 2003-001078

(51) Int. Cl.
*H04B 1/00*   (2006.01)

(52) U.S. Cl. ..................... 381/86; 381/92; 381/365

(58) Field of Classification Search .................. 381/86, 381/365, 389, 92, 302, 71.5, 71.7, 357, 71.1–71.14; 296/214, 210
See application file for complete search history.

(56) References Cited

U.S. PATENT DOCUMENTS

| | | | |
|---|---|---|---|
| 3,995,124 A * | 11/1976 | Gabr ........................... | 381/357 |
| 5,801,616 A | 9/1998 | Ghazarian et al. | |
| 6,078,673 A * | 6/2000 | von Flotow et al. ....... | 381/71.7 |
| 6,182,171 B1 | 1/2001 | Akatsuka et al. | |
| 6,216,018 B1 | 4/2001 | Nakanishi et al. | |
| 6,272,360 B1 * | 8/2001 | Yamaguchi et al. ...... | 455/569.2 |
| 6,748,308 B2 * | 6/2004 | Losey ........................ | 701/49 |
| 6,845,162 B1 * | 1/2005 | Emborg et al. ............ | 381/71.4 |
| 2002/0031234 A1 * | 3/2002 | Wenger et al. ............. | 381/86 |
| 2002/0046033 A1 | 4/2002 | Ono et al. | |
| 2002/0143452 A1 | 10/2002 | Losey | |
| 2003/0068060 A1 * | 4/2003 | Olson ......................... | 381/365 |
| 2005/0156753 A1 * | 7/2005 | DeLine et al. ............. | 340/693.5 |
| 2005/0276423 A1 * | 12/2005 | Aubauer et al. ............ | 381/92 |

FOREIGN PATENT DOCUMENTS

| | | |
|---|---|---|
| JP | 10-210131 | 8/1998 |
| JP | P2001-119450 A | 4/2001 |
| JP | P2002-123283 A | 4/2002 |

* cited by examiner

*Primary Examiner*—Vivian Chin
*Assistant Examiner*—Corey Chau
(74) *Attorney, Agent, or Firm*—McDermott Will & Emery LLP

(57) ABSTRACT

In a vocal sound input apparatus for an automotive vehicle, both a receiving microphone and a noise collecting microphone are provided, both of the receiving microphone and the noise collecting microphone being arranged onto a predetermined portion of a vehicle body in such a manner that a direction of a sensitivity of the receiving microphone is opposite to that of the noise collecting microphone for the receiving microphone to enable to receive a vocal sound from a speaker and for the noise collecting microphone to enable to collectively receive a noise of a surrounding of the speaker.

12 Claims, 4 Drawing Sheets

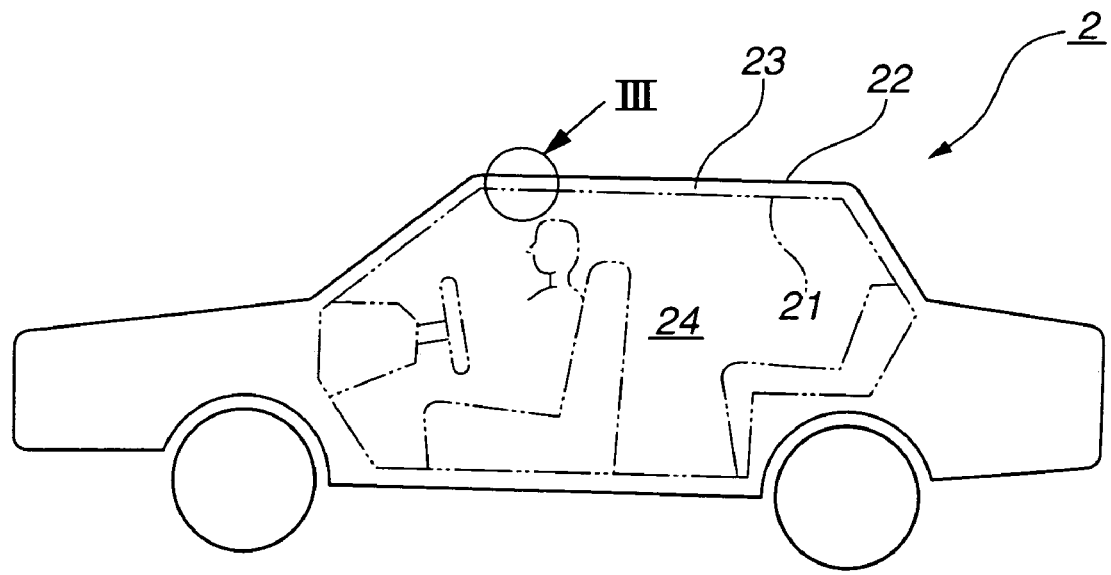
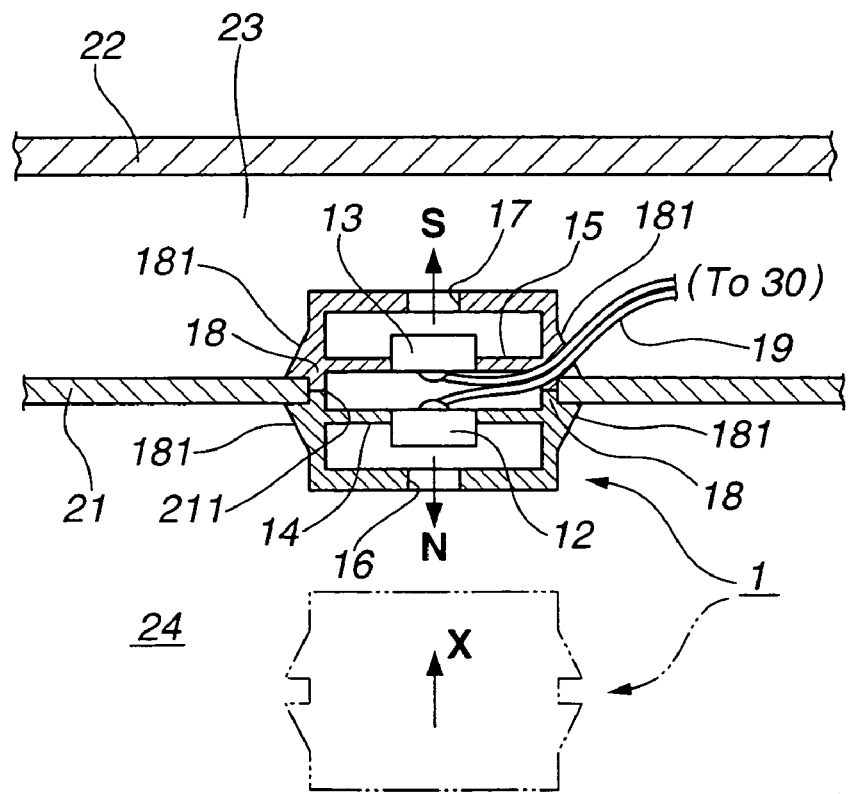

FIG.4
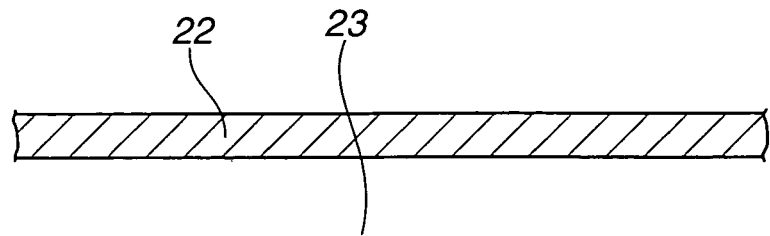
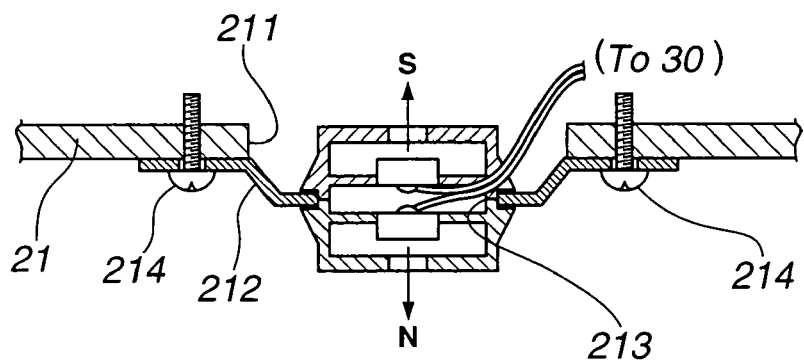
FIG.5
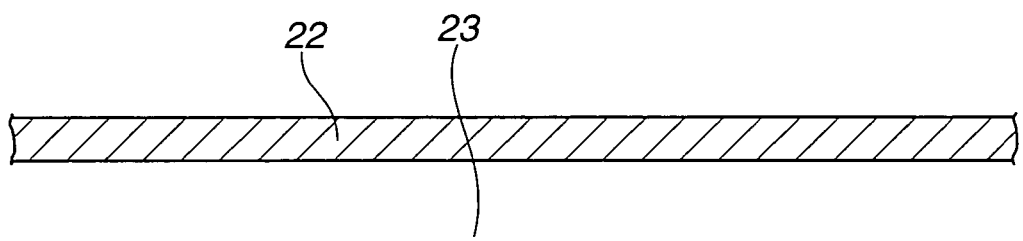
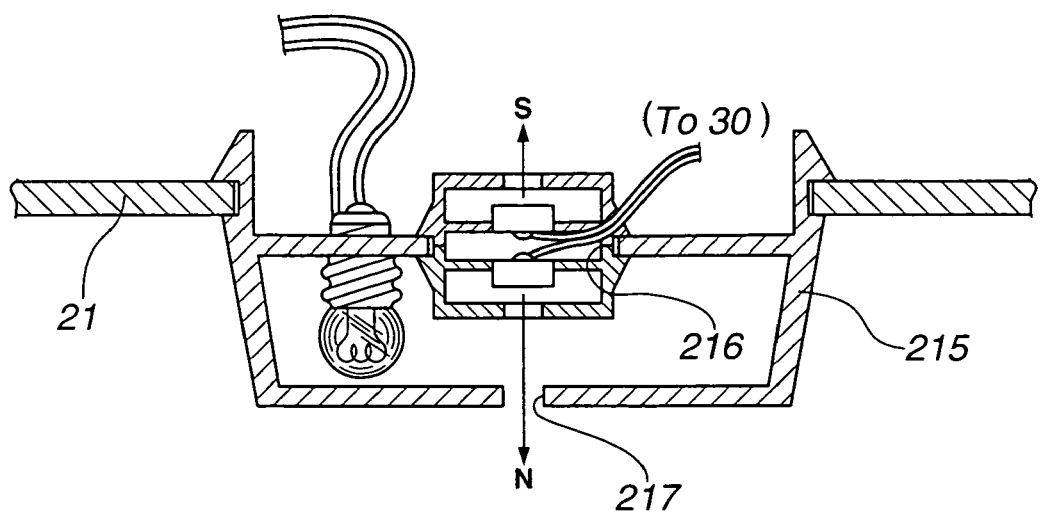

VOCAL SOUND INPUT APPARATUS FOR AUTOMOTIVE VEHICLE

BACKGROUND OF THE INVENTION

1. Field of the Invention

The present invention relates to a vocal sound input apparatus mounted in an automotive vehicle and relates especially to a mounting structure of both of a talk receiving microphone and a noise collecting microphone on the automotive vehicle.

2. Description of the Related Art

A telephone hand-free apparatus has been known as an automotive telephone system which is capable of carrying out a telephone conversation while a vehicle driver drives the vehicle. In the telephone hand-free apparatus, a microphone to input a vocal sound of a speaker and a speaker to output a vocal sound of a telephone conversation party are disposed within a passenger compartment of the vehicle. By connecting a portable (or cellular) telephone to the telephone hand-free apparatus, the telephone conversation can be carried out while the vehicle driver grasps a steering wheel of the vehicle, as disclosed in a Japanese Patent Application First Publication No. 2001-119450 published on Apr. 27, 2001. In addition, a voice recognition operation system has been proposed which controls a vehicle mounted equipment such as a car navigation device. In a conventional voice recognition operation system, a microphone to input a vocal sound of an operator is disposed within the passenger compartment. The vocal sound inputted to this microphone can operate various vehicle mounted pieces of equipment as a control command, as disclosed in a Japanese Patent Application First Publication No. 2002-123283 published on Apr. 26, 2002 (which corresponds to a United States Patent Application Publication No. US2002/0046033 published on Apr. 18, 2002).

In such a vehicle mounted telephone apparatus or vehicle mounted vocal sound recognition apparatus as described above, it is necessary to receive and recognize the vocal sound accurately even if a surrounding noise is large during a high-speed travel of the vehicle. In general, if the vehicle makes a high-speed travel, a traveling noise becomes large and S/N ratio (a signal-to-noise ratio) becomes worsened. An accurate vocal sound reception becomes difficult. Hence, it is necessary to devise a layout (for example, the microphone is disposed in the proximity to a speaker) so that a signal level is maintained at a high level. Furthermore, as a technology of maintaining the S/N ratio, the noise is collected by means of another telephone and accommodated to the input of the speaking microphone only to eliminate the noise components has been proposed. A phase of the noise is inverted to synthesize an original signal (vocal sound signal mixed with a noise) so that a noise cancel mechanism has been proposed in which only noise component is cancelled to obtain a desired signal (refer to a Japanese Patent Application First Publication No. Heisei 10-210131 published on Aug. 7, 1998.

SUMMARY OF THE INVENTION

However, it is necessary to prepare a plurality of microphones to adopt this noise cancel mechanism. The receiving microphone is disposed on a ceiling interior portion just above a vehicular passenger compartment at which a voice of the speaker is easy to receive or on a map lamp interior portion. It is necessary to dispose the noise collecting microphone at a position at which the same noise as the receiving microphone can be collected and at which the vocal sound of the speaker is not easy to receive. Therefore, it is necessary to attach the receiving microphone and noise collecting microphone at mutually different positions. Hence, the number of parts becomes increased and the number of (labor) man-hours of mounting operations are accordingly increased.

It is, therefore, an object of the present invention to provide a vocal sound input apparatus for an automotive vehicle which is capable of disposing a plurality of microphones without increases in the number of parts and in the (labor) man-hour.

The above-described object can be achieved by providing a novel vocal sound input apparatus for an automotive vehicle. The vocal sound input apparatus includes a receiving microphone and a noise collecting microphone. Both the receiving microphone and the noise collecting microphone are disposed at a predetermined portion of a vehicle body in such a manner that a sensitivity direction of the receiving microphone is opposite to a sensitivity direction of the noise collecting microphone. The sensitivity direction of the receiving microphone is oriented towards inside of a vehicular passenger compartment, and the sensitivity direction of the noise collecting microphone is oriented towards a space between a vehicle body outer plate and a wall of the vehicular passenger compartment. The noise collecting microphone is disposed in the space between the vehicle body outer plate and the wall of the vehicular passenger compartment.

The above-described object can also be achieved by providing a vocal sound input apparatus for an automotive vehicle, comprising: a receiving microphone to input a vocal sound from a speaker; and a noise collecting microphone to collectively input a surrounding noise of a speaker, both of the receiving microphone and the noise collecting microphone are mounted integrally to each other in such a manner that a sensitivity direction of the receiving microphone is reversed to that of the noise collecting microphone.

The above-described object can also be achieved by providing a vocal sound input apparatus for an automotive vehicle, comprising a receiving microphone to input a vocal sound from a speaker, and a noise collecting microphone to collectively input a surrounding noise of the speaker. Both of the receiving microphone and the noise collecting microphone are attached onto an interior trim material defining a vehicular passenger compartment in such a manner that a sensitivity direction of the receiving microphone is oriented towards inside of the vehicular passenger compartment and the noise collecting microphone is oriented towards a space between a vehicular body outer plate and the interior trim material. The noise collecting microphone is disposed in the space between the vehicle body outer plate and the interior trim material.

This summary of the invention does not necessarily describe all necessary features so that the invention may also be a sub-combination of these described features.

BRIEF DESCRIPTION OF THE DRAWINGS

FIG. 2 is a side view of a mounting position of the microphone assembly in the vocal sound input apparatus shown in FIG. 1.

FIG. 3 is an exploded cross sectional view cut away along a portion of III shown in FIG. 2.

FIG. 4 is a cross sectional view of another mounting structure of the microphone assembly shown in FIG. 1.

FIG. 5 is a cross sectional view of a still another mounting structure of the microphone assembly in the vocal sound input apparatus shown in FIG. 1.

DETAILED DESCRIPTION OF THE PREFERRED EMBODIMENTS

Reference will hereinafter be made to the drawings in order to facilitate a better understanding of the present invention.

Figure 1:
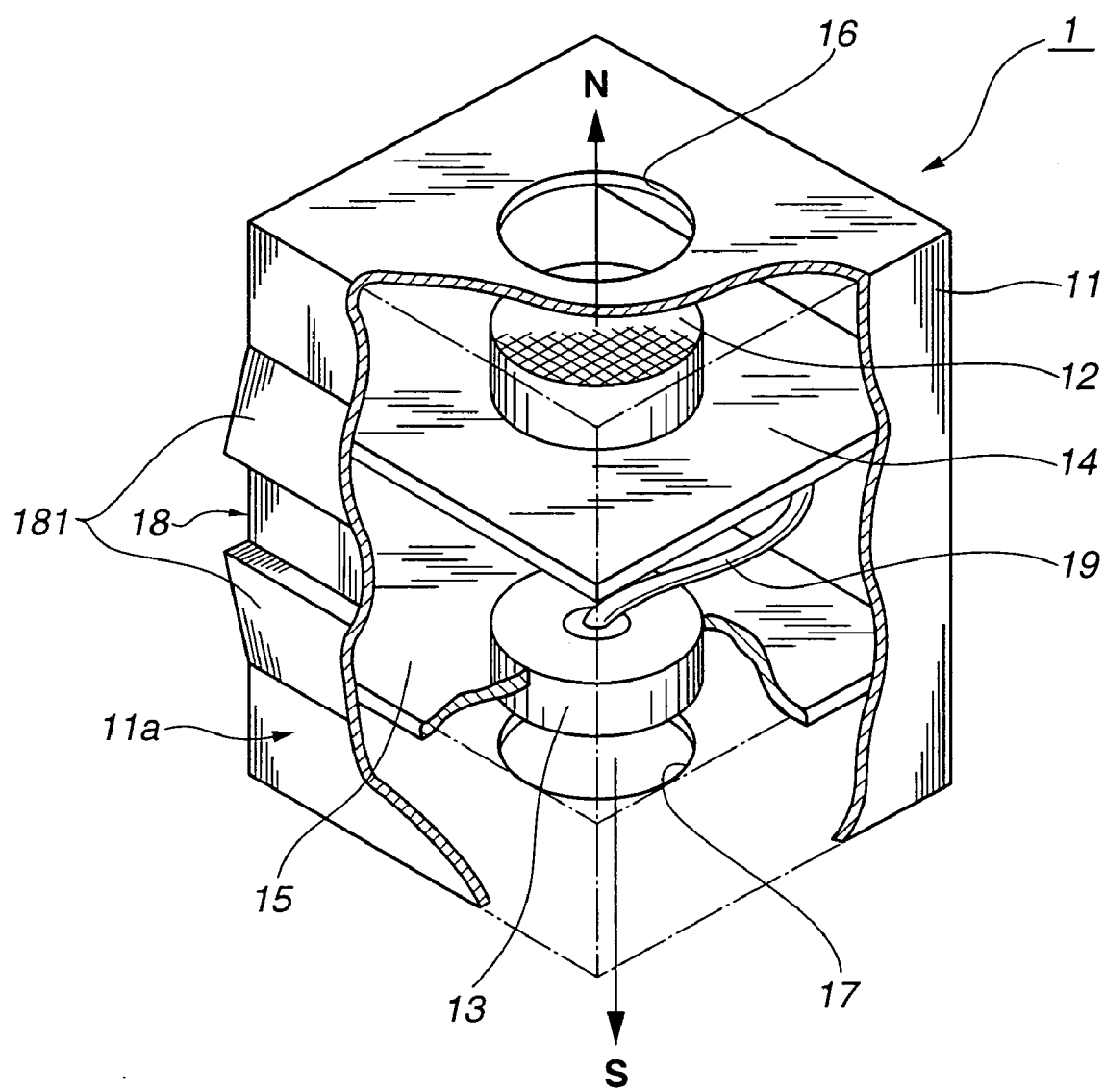
FIG. 1 is a partially broken perspective view of a microphone assembly of a vocal sound input apparatus in a preferred embodiment according to the present invention.

FIG. 1 shows a partially broken perspective view representing a microphone assembly (ASSY) of a vocal sound input apparatus in a preferred embodiment according to the present invention. FIG. 2 shows a side view of a vehicle body representing a mounting position of the microphone assembly (ASSY) in the preferred embodiment according to the present invention. FIG. 3 shows an enlarged cross sectional view representing a part of III shown in FIG. 2.

Microphone assy (hereinafter, referred to a microphone assembly) 1 shown in FIG. 1 includes a speech (or talk) receiving microphone 12 to input a vocal sound of a speaker (hereinafter, referred simply to as a receiving microphone) and a noise collecting microphone 13 to collectively input a noise of a surrounding of the speaker are built in a (box-shaped) frame 11, a sensitivity direction of each of these microphones 12 and 13 being mutually opposite by 180° (reversed). The sensitivity direction of receiving microphone 11 is denoted by N and that of noise collecting microphone 13 is denoted by S. Receiving microphone 12 is mounted on a first partitioning wall (plate) 14 disposed within frame 11. Noise collecting microphone 13 is attached onto a second partitioning wall (plate) 15 mounted within frame 11 in the same manner. In addition, a first sound collecting opening portion 16 is formed to pass the vocal sound on a main surface of frame 11 opposing the sensitivity direction N of receiving microphone 12. A second sound collecting opening portion 17 is formed to pass the vocal sound on a main surface of frame 11 opposing to sensitivity direction S of noise collecting microphone 13.

These first partitioning wall (plate) 14, second partitioning wall (plate) 15, first sound collecting opening portion 16, and second sound collecting opening portion 17 serve to prevent the vocal sound input from any other directions than sensitivity direction N to receiving microphone 12 within frame 11 and serve to input the vocal sound only via first sound collecting opening portion 16. The vocal sound from any other directions than sensitivity direction S is not inputted to noise collecting microphone 13 via second sound collecting opening portion 17. It is noted that both of first partitioning wall (plate) 14 and second partitioning wall (plate) 15 may not exhibit a perfect sound shielding effect within frame 11. The vocal sound from sensitivity direction S may, at least, not inputted to receiving microphone 13 and the vocal sound from sensitivity direction N may, at least, not inputted to noise collecting microphone 13.

A pair of engagement portions 18 are formed which are engaged with a ceiling interior trim material 21 shown in FIG. 3 on an outside surface of frame 11. The pair of engagement portions 18 are formed on two side surfaces of a surface 11a of frame 11 shown in FIG. 1 and its opposing surface (hidden and not viewed from FIG. 1). It is noted that a reference numeral 19 shown in FIG. 1 denotes a signal output electrical wire of noise collecting microphone 13 (another signal output electrical wire of receiving microphone 12 is hidden and is not viewed from FIG. 1).

Microphone assembly 1 in the preferred embodiment shown in FIG. 1 is attached onto a ceiling trim interior material 21 to partition a vehicular passenger compartment 24 shown in FIG. 2. On vehicle body 2 shown in FIG. 2, interior trim material 21 (denoted by a dot-and-dot-and-dash line (phantom line) in FIG. 2) is disposed within an inside of a vehicular body outer plate (roof panel) 22. This interior trim material 21 defines vehicular passenger compartment 24. A portion of vehicle body 2 is provided with a clearance 23 formed between interior material 21 and vehicle body outer plate 22, for example, at a roof portion of a vehicular passenger compartment shown in FIG. 3. In FIG. 3, a reference numeral 22 denotes roof panel, a, reference numeral 21 denotes a ceiling interior trim material, and a reference numeral 23 denotes a clearance positioned between roof panel (outer plate) 22 and ceiling interior trim material 21.

In this embodiment, utilizing gap (clearance) 23, microphone assy (assembly) 1 is mounted on ceiling interior trim material 21. The position at which microphone assy 1 is attached is desirable to mount on an upper part of a driver's seat at which the vocal sound of the driver who is the speaker is easiest to be inputted. The sensitivity direction N of receiving microphone 12 is oriented toward an inside of vehicular passenger compartment 24. The sensitivity direction N of receiving microphone 12 is oriented within clearance 23 between roof panel 22 and ceiling interior trim material 21. Specifically, an attachment hole 211 of microphone assembly 1 is formed on ceiling interior trim material 21 and the pair of engagement portions 18 formed on side surfaces 11a of frame 11 of microphone assembly 1 are provided with slant surfaces 181 as shown in FIGS. 1 and 3. Hence, an insertion of microphone assembly 1 in an arrow marked direction of X shown in FIG. 3 permits an easy attachment of microphone assembly 1.

Figure 6:
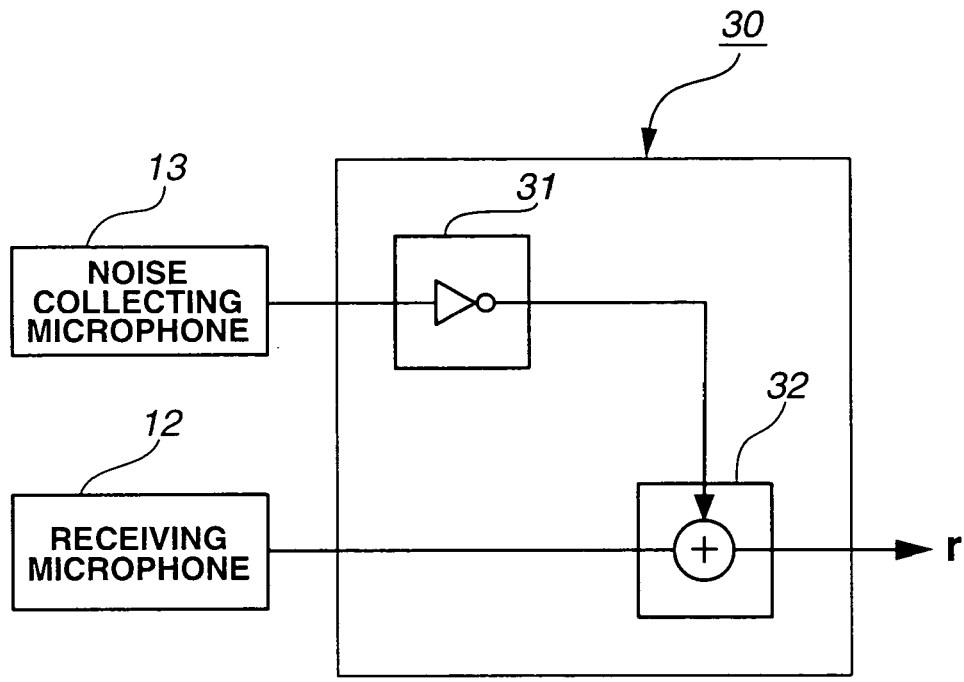
FIG. 6 is a circuit wiring-and-block diagram of an example of a noise canceling circuit using the microphone assembly shown in FIG. 1.
Figure 7:
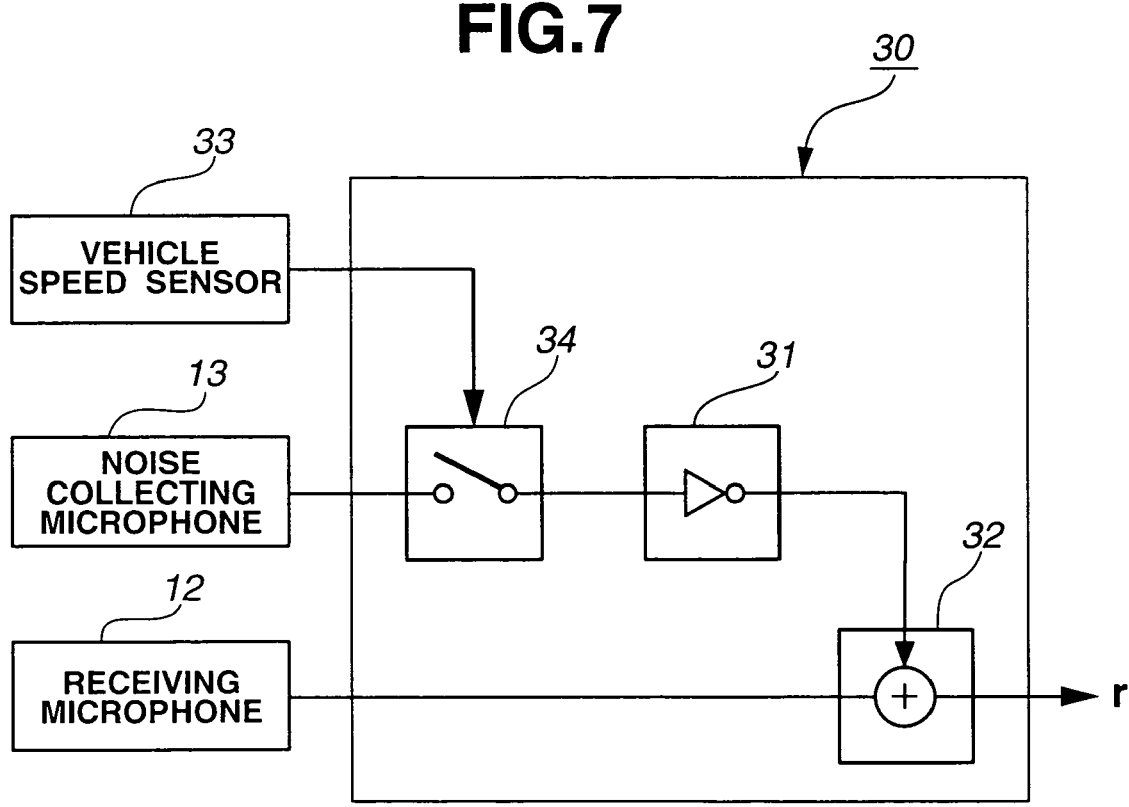
FIG. 7 is a circuit wiring-and-block diagram of another example of the noise canceling circuit using the microphone assembly shown in FIG. 1.

FIG. 6 shows a circuit wiring-and-block diagram representing one example of a noise canceling circuit 30 using microphone assembly 1 (shown in FIG. 1) according to the present invention. A vocal sound signal from receiving microphone assy (assembly) 1 and that from noise collecting microphone 13 are inputted to noise canceling circuit 30. The vocal signal from noise collecting microphone 13 has a phase inverted by 180° by means of an inverter 31 and an adder 32 serves to add the phase inverted vocal sound signal to the vocal sound signal from adder 32. Thereafter, the added signal is outputted to an automotive telephone hand-free apparatus or an automotive voice (speech) recognition system as an output (microphone) signal r. The voice recognition system mounted in the vehicle is exemplified by two U.S. Pat. No. 5,801,616 issued on Sep. 1, 1998 and U.S. Pat. No. 6,182,171 issued on Jan. 30, 2001, the disclosure of each of the above-described United States patents being herein incorporated by reference. The telephone hand-free apparatus is exemplified by a U.S. Pat. No. 6,216,018 issued on Apr. 10, 2001, the disclosure of which is herein incorporated by reference.

A main noise during the traveling includes an engine noise and traveling noise of tire wheels of the vehicle. Such a noise as described above is invaded into vehicular passenger compartment 24 via interior trim material 21 from vehicle body outer plate 22. In a generally available monocoque body structure, aerial gap (clearance) 23 between vehicular body outer plate 22 and vehicular passenger compartment 24 is connected in a certain form. Hence, noise is also present in aerial gap (clearance) 23 between roof outer plate (roof panel) 22 shown in FIG. 3 and ceiling interior trim material 21. On the contrary, the vocal sound of the speaker within passenger compartment 24 is mainly resided within vehicular passenger compartment 24 so as not to be transmitted to aerial gap (clearance) 23 between vehicular body outer plate (roof panel) 22 and vehicular passenger compartment 24. If the vocal sound of the speaker were transmitted to aerial gap (clearance) 23, the vocal sound is remarkably attenuated and its volume becomes small.

Hence, the vocal sound from the speaker (for example, a vehicle driver) and the noise within vehicular passenger compartment 24 are inputted to receiving microphone 12. However, since the noise transmitted within the vehicular passenger compartment 24 is inputted to noise collecting microphone 13, these are synthesized so as to enable the removal of only noise components and to enable an extraction of the speaker's vocal sound at a high level.

It is noted that the attachment (mounting) structure of microphone assembly 1 may variously be modified other than the structure shown in FIG. 3. For example, a bracket 212 on which attachment hole 213 is formed as shown in FIG. 4 is prepared. The engagement portion of microphone assembly 1 is engaged with attachment hole 213 and this bracket 212 can be fixed to ceiling interior trim material 21 by means of bolts 214 (fixing means) via attachment hole 211.

Furthermore, utilizing other parts pre-attached onto the ceiling interior material 21, the microphone assembly 1 may be attached thereonto. For example, as shown in FIG. 5, attachment hole 216 is formed on parts 215 such as a map lamp, a room lamp, or a room mirror base and engagement portions 18 of microphone assembly 1 are engaged thereto. At this time, an opening 217 is formed which corresponds to first sound collection opening portion (16 shown in FIG. 1) at a position opposing to receiving microphone 12.

In addition, noise canceling circuit 30 using microphone assembly 1 according to the present invention is not limited to that shown in FIG. 6, various modifications can be made without departing from the sprit and scope of the present invention. For example, since the noise transmitted within the vehicular passenger compartment is correlated to the traveling speed, a switch 34 which is closed when the vehicle speed increases and becomes equal to or higher than a predetermined vehicle speed in response to a detection signal from vehicle speed sensor 33 is connected to noise collecting microphone 13. Then, in a case where the vehicle is traveling at a speed lower than the predetermined vehicle speed, the vocal sound signal from receiving microphone 12 is only an output signal r to be outputted to automotive vehicle telephone hand-free apparatus or automotive vehicle voice (speech) recognition system, while, in a case where the vehicle is traveling at a speed equal to or higher than the predetermined vehicle speed, a common use of noise collecting microphone 13 to receiving microphone 12 causes an increase in a vocal sound level outputted from the speaker (speaking person).

Various changes and modifications may be made without departing from the scope and sprit of the present invention which is defined in the appended claims.

The entire contents of a Japanese Patent Application No. 2003-001078 (filed in Japan on Jan. 7, 2003) are herein incorporated by reference. The scope of the invention is defined with reference to the following claims.

What is claimed is:

1. A vocal sound input apparatus for an automotive vehicle, comprising:
    a receiving microphone; and
    a noise collecting microphone, both of the receiving microphone and the noise collecting microphone being integrally mounted within a microphone assembly at a predetermined portion on a vehicle body in such a manner that a sensitivity direction of the receiving microphone is opposite to a sensitivity direction of the noise collecting microphone, wherein:
    the sensitivity direction of the receiving microphone is oriented towards inside of a vehicular passenger compartment to collect vocal signals from the passenger compartment,
    the sensitivity direction of the noise collecting microphone is oriented towards a space between a vehicle body outer plate and a wall of the vehicular passenger compartment,
    the noise collecting microphone is disposed in the space between the vehicle body outer plate and the wall of the vehicular passenger compartment, and configured to collect noise in the space between the vehicle body outer plate and the wall of the vehicular passenger compartment,
    the noise collecting microphone is insulated to prevent the sound signals from the passenger compartment from entering the noise collecting microphone, and
    the sound signals collected by the receiving microphone and the noise collected by the noise collecting microphone are combined to generate an output signal.

2. A vocal sound input apparatus for an automotive vehicle as claimed in claim 1, wherein the receiving microphone and the noise collecting microphone are attached to a microphone assembly disposed on a ceiling portion of the vehicular passenger compartment.

3. A vocal sound input apparatus for an automotive vehicle as claimed in claim 2, wherein the microphone assembly comprises: a first plate having a first circular center hole into which the receiving microphone is fitted, a second plate juxtaposed to the first plate and having a center hole into which the noise collecting microphone is fitted; a third plate having a third circular center hole with its center point through which a first line denoting the sensitivity direction of the receiving microphone is penetrated; and a fourth plate having a fourth circular center hole with its center point through which a second line denoting the sensitivity direction of the noise collecting microphone is penetrated, both of the first line and the second line being on the same line but the directions thereof being mutually 180° opposite to each other.

4. A vocal sound input apparatus for an automotive vehicle as claimed in claim 3, wherein the microphone assembly further includes engagement portions on side surfaces of the microphone assembly to engage with an interior trim material of a roof portion of the vehicular passenger compartment.

5. A vocal sound input apparatus for an automotive vehicle as claimed in claim 4, wherein the microphone assembly further comprises a bracket having an attachment hole to a peripheral wall to which the engagement portions of the microphone assembly is engaged and the bracket is fixed to the interior trim material of the roof portion by fixing means, the first line being oriented towards the vehicular passenger compartment and the second line being oriented towards the roof portion of a vehicular outer plate.

6. A vocal sound input apparatus for an automotive vehicle as claimed in claim 4, wherein the microphone assembly further comprises a room mirror base having an attachment hole to which the engagement portion of the receiving microphone is engaged, and an opening formed on a portion of the room mirror base which faces towards the receiving microphone.

7. A vocal sound input apparatus for an automotive vehicle as claimed in claim 1, wherein the noise collecting microphone is connected to an adder via an inverter and the receiving microphone is connected to the adder, and an output of the adder is connected to a voice recognition system mounted in the vehicle.

8. A vocal sound input apparatus for an automotive vehicle as claimed in claim 7, wherein a vehicle speed sensor is connected to a switch to connect the noise collecting microphone to the inventer when a vehicle speed detected by the vehicle speed sendor is equal to or higher than a predetermined vehicle speed.

9. A vocal sound input apparatus for an automotive vehicle as claimed in claim 1, wherein one of the microphones is connected to an adder via an inverter, and the other one of the microphones is connected to the adder, and an output of the adder is connected to a hand-free telephone apparatus mounted in the vehicle.

10. A vocal sound input apparatus for an automotive vehicle, comprising: a receiving microphone configured to input a vocal sound from a speaker; and a noise collecting microphone configured to collectively input a surrounding noise of a speaker,
wherein:
both of the receiving microphone and the noise collecting microphone are integrally mounted within a microphone assembly, and are mounted to each other in such a manner that a sensitivity direction of the receiving microphone is different from a sensitivity direction of the noise collecting microphone,
the sensitivity direction of the receiving microphone is oriented towards inside of a vehicular passenger compartment to collect vocal signals from the passenger compartment,
the sensitivity direction of the noise collecting microphone is oriented towards a space between a vehicle body outer plate and a wall of the vehicular passenger compartment,
the noise collecting microphone is disposed in the space between the vehicle body outer plate and the wall of the vehicular passenger compartment, and configured to collect noise in the space between the vehicle body outer plate and the wall of the vehicular passenger compartment,
the noise collecting microphone is insulated to prevent the sound signals from the passenger compartment from entering the noise collecting microphone, and
the sound signals collected by the receiving microphone and the noise collected by the noise collecting microphone are combined to generate an output signal.

11. A vocal sound input apparatus for an automotive vehicle, comprising:

a receiving microphone configured to input a vocal sound from a speaker; and a noise collecting microphone configured to collectively input a surrounding noise of the speaker, both of the receiving microphone and the noise collecting microphone being integrally mounted within a microphone assembly and attached onto an interior trim material defining a vehicular passenger compartment in such a manner that a sensitivity direction of the receiving microphone is oriented towards inside of the vehicular passenger compartment to collect vocal signals from the passenger compartment, and the noise collecting microphone is oriented towards a space between a vehicular body outer plate and the interior trim material, and configured to collect noise in the space between the vehicle body outer plate and interior trim material, wherein:

the noise collecting microphone is disposed in the space between the vehicle body outer plate and the interior trim material, the noise collecting microphone is insulated to prevent the sound signals from the passenger compartment from entering the noise collecting microphone, and the sound signals collected by the receiving microphone and the noise collected by the noise collecting microphone are combined to generate an output signal.

12. A vocal sound input apparatus for an automotive vehicle, comprising:

a receiving microphone; and a noise collecting microphone;

wherein:

the receiving microphone and the noise collecting microphone are disposed integrally mounted within a microphone assembly at a predetermined portion of a vehicle body, and a sensitivity direction of the noise collecting microphone is oriented towards a space between a vehicle body outer plate and a vehicular passenger compartment trim material, and configured to collect noise in the space between the vehicle body outer plate and the wall of the vehicular passenger compartment, and a sensitivity direction of the receiving microphone is oriented towards inside of the vehicular passenger compartment to collect vocal signals from the passenger compartment, wherein the noise collecting microphone is insulated to prevent the sound signals from the passenger compartment from entering the noise collecting microphone, and to prevent a noise from being inputted to the receiving microphone from the sensitivity direction of the noise collecting microphone, the noise collecting microphone is disposed in the space between the vehicle body outer plate and the vehicular passenger compartment trim materail; and the sound signals collected by the receiving microphone and the noise collected by the noise collecting microphone are combined to generate an output signal.

* * * * *